(12) United States Patent
Poertner et al.

(10) Patent No.: US 9,481,363 B2
(45) Date of Patent: Nov. 1, 2016

(54) METHOD FOR OPERATING A HYBRID VEHICLE

(71) Applicant: Robert Bosch GmbH, Stuttgart (DE)

(72) Inventors: Nikolas Poertner, Stuttgart (DE); Jie Ge, Stuttgart-Hausen (DE); Stephan Mietens, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/722,717

(22) Filed: May 27, 2015

(65) Prior Publication Data

US 2015/0353076 A1 Dec. 10, 2015

(30) Foreign Application Priority Data

Jun. 4, 2014 (DE) .................. 10 2014 210 537

(51) Int. Cl.
*B60W 20/50* (2016.01)
*B60W 30/02* (2012.01)
*B60K 6/26* (2007.10)
*B60K 6/485* (2007.10)
*B60L 15/20* (2006.01)
*B60W 20/00* (2016.01)

(52) U.S. Cl.
CPC ............ *B60W 20/50* (2013.01); *B60K 6/26* (2013.01); *B60K 6/485* (2013.01); *B60L 15/20* (2013.01); *B60W 30/02* (2013.01); *B60W 2520/30* (2013.01); *B60W 2710/083* (2013.01); *Y02T 10/6226* (2013.01); *Y02T 10/7258* (2013.01); *Y10S 903/906* (2013.01)

(58) Field of Classification Search
CPC ....... B60W 20/50; B60W 30/02; B60K 6/26; B60L 15/20
USPC ............................................... 701/22
See application file for complete search history.

(56) References Cited

U.S. PATENT DOCUMENTS

| 8,002,058 B2* | 8/2011 | Ishikawa | B60K 6/365 180/65.21 |
| 2007/0223259 A1* | 9/2007 | Nozaki | B60K 6/485 363/50 |
| 2013/0035818 A1* | 2/2013 | Meitinger | B60K 6/448 701/22 |
| 2013/0179015 A1* | 7/2013 | Liang | B60W 10/08 701/22 |

(Continued)

FOREIGN PATENT DOCUMENTS

| DE | 19528628 A1 | 2/1997 |
| DE | 102010014971 A1 | 10/2011 |

(Continued)

*Primary Examiner* — Mussa A Shaawat
*Assistant Examiner* — Yazan Soofi
(74) *Attorney, Agent, or Firm* — Norton Rose Fulbright US LLP

(57) ABSTRACT

In a method for operating a hybrid vehicle, a total wheel drive torque is composed of a wheel drive torque of an internal combustion engine of the vehicle and a wheel drive torque of an electric machine of the vehicle, and the total wheel drive torque is selectively increased or decreased by the wheel drive torque of the electric machine in one of a motor mode or a generator mode of the electric machine. The electric machine is operated such that (i) the sum of the wheel drive torques of the electric machine and a wheel-drive-torque-reducing safety measure carried out remains constant in the generator mode, or (ii) the sum of the wheel drive torques of the electric machine and a wheel drive torque-increasing safety measure carried out remains constant in the motor mode.

11 Claims, 2 Drawing Sheets

(56) References Cited

U.S. PATENT DOCUMENTS

2014/0249721 A1* 9/2014 Schindler ............ B60W 10/04
 701/41
2015/0239442 A1* 8/2015 Yamakado ............ B60L 3/102
 701/70

FOREIGN PATENT DOCUMENTS

| DE | 102011084929 A1 | 4/2013 |
| DE | 102013100211 A1 | 8/2013 |
| DE | 102013000379 A1 | 7/2014 |
| JP | 2013063722 A | 4/2013 |

* cited by examiner

METHOD FOR OPERATING A HYBRID VEHICLE

BACKGROUND OF THE INVENTION

1. Field of the Invention

The present invention relates to a method for operating a hybrid vehicle including an internal combustion engine and an electric machine.

2. Description of the Related Art

Hybrid vehicles usually include an internal combustion engine as a main drive and at least one auxiliary drive. One such auxiliary drive is in particular designed as an electric machine. A drive torque for driving the hybrid vehicle is generated by the internal combustion engine. This drive torque is transmitted, among others, via the transmission and the drive shaft to the wheels of the hybrid vehicle, a wheel drive torque each being generated by the internal combustion engine at the wheels of the hybrid vehicle.

With the aid of the electric machine, a boost recuperation system (BRS), for example, may be implemented. For this purpose, the electric machine may be connected via a belt, for example, to the crankshaft of the internal combustion engine.

In a generator operating mode, the electric machine absorbs a drive torque and converts mechanical energy into electrical energy. The wheel drive torque at the wheels is reduced during this process by the electric machine. The electric machine thus generates a "negative" active wheel drive torque.

In a motor operating mode, the electric machine converts electrical energy back into mechanical energy and generates a drive torque. The wheel drive torque at the wheels is increased during this process by the electric machine. The electric machine thus generates a "positive" active wheel drive torque.

A total wheel drive torque at the wheels is thus composed of the wheel drive torque of the internal combustion engine and of the wheel drive torque of the electric machine.

Driver assistance functions are safety measures which may act in a wheel drive torque-increasing or wheel drive torque-reducing way. In unstable or stability-critical driving states, such driver assistance functions may intervene in the vehicle dynamics in a stabilizing manner. Such safety measures may influence in particular the internal combustion engine or the brakes in order to either increase or reduce the wheel drive torque and to thus stabilize the vehicle dynamics. Such safety measures are, for example, the electronic stability program (ESP), the engine drag torque control (MSR), the traction control system (TCS) or the anti-lock braking system (ABS).

However, in hybrid vehicles there is the risk of such unstable or stability-critical driving states becoming increasingly worse due to the wheel drive torque of the electric machine despite the safety measure attempting to stabilize the vehicle dynamics. An accident risk may thus be increased and there is a considerable danger for occupants of the hybrid vehicle as well as other road users.

Although the electric machine may be shut off in such situations, unstable or stability-critical driving states may in certain cases become even worse due to this shut-off of the electric machine and the thus sudden loss of wheel drive torque of the electric machine. The accident risk may thus be even increased by the uncontrolled shut-off of the electric machine during unstable or stability-critical driving states.

It is therefore desirable to provide a possibility of stabilizing a hybrid vehicle in unstable or stability-critical driving states in a safe manner.

BRIEF SUMMARY OF THE INVENTION

According to the present invention, a method for operating a hybrid vehicle including an internal combustion engine and an electric machine is provided.

A total wheel drive torque is here composed of a wheel drive torque of the internal combustion engine and of a wheel drive torque of the electric machine. In a motor operating mode, the electric machine puts out a drive torque, which corresponds to a positive active wheel drive torque of the electric machine, and the total wheel drive torque is increased. In a generator operating mode, the electric machine absorbs a drive torque, which corresponds to a negative active wheel drive torque of the electric machine, and the total wheel drive torque is reduced.

The hybrid vehicle may also include multiple electric machines which respectively generate a corresponding active wheel drive torque and respectively contribute a portion to the total wheel drive torque. The present invention is described below relating to an electric machine. The present invention similarly applies also to a hybrid vehicle including multiple electric machines.

According to the present invention it is monitored or checked whether a wheel drive torque-increasing safety measure or a wheel drive torque-reducing safety measure is to be carried out. Such a safety measure is in particular a driver assistance function. This function is triggered in particular in unstable or stability-critical driving states in order to stabilize the vehicle dynamics. Due to the corresponding safety measures, the total wheel drive torque is either increased or reduced. Such safety measures are wheel drive torque-modifying safety measures.

In the course of the wheel drive torque-reducing safety measure, the total wheel drive torque is to be reduced, for example, because the wheels spin during acceleration. If at this point in time the electric machine is operated in the generator operating mode, the total wheel drive torque is already being reduced by the electric machine.

Similarly, the wheel drive torque-increasing safety measure is to increase the total wheel drive torque, for example, because the wheels begin to slip when the accelerator is released. If at this point in time the electric machine is operated in the motor operating mode, the total wheel drive torque is already being increased by the electric machine.

The electric machine thus achieves in these two cases the same effect on the total wheel drive torque as the safety measure to be carried out. An instantaneous, direct shut-off of the electric machine would thus counteract the safety measure to be carried out.

According to the present invention, the electric machine is operated in such a way, in particular transferred into an inactive operating mode, that the sum of the wheel drive torque of the electric machine and the wheel drive torque of the safety measure is constant when one of the wheel drive torque-modifying safety measures is to be carried out and when the electric machine is operated in the one operating mode which causes the same modification of the total wheel drive torque as the safety measure to be carried out. This means that the active wheel drive torque of the electric machine is gradually reduced in absolute value in such a way that the sum of the modification of the active wheel drive torque of the electric machine and the modification of all other wheel drive torque portions of the total wheel drive torque is constantly zero until the active wheel drive torque of the electric machine is itself reduced to zero (i.e., until the electric machine reaches the inactive operating mode). Subsequently, the electric machine advantageously remains in the inactive operating mode until the wheel drive torque-modifying safety measure is concluded.

This is the case when, on the one hand, the wheel drive torque-reducing safety measure is to be carried out and when the electric machine is operated in the generator operating mode, or, on the other hand, when the wheel drive torque-increasing safety measure is to be carried out and when the electric machine is operated in the motor operating mode.

In the course of the safety measure, in particular the wheel drive torque of the internal combustion engine is either increased or reduced depending on the safety measure to be carried out, and the wheel drive torque of the electric machine is simultaneously reduced in absolute value to the same degree. The total wheel drive torque remains unaffected by this. The electric machine is therefore operated total-wheel-drive-neutrally with the advantages listed below.

In this way, the electric machine is in particular gradually transferred into an inactive operating mode when one of the safety measures is to be carried out. This transfer takes place in particular total-wheel-drive-neutrally. It is thus prevented that the electric machine creates undesirable influences on the total wheel drive torque. The active wheel drive torque of the electric machine is thus reduced to zero.

Thus only the wheel drive torque of the internal combustion engine must ultimately be taken into account in the course of the safety measure.

In this inactive operating mode, the electric machine is in particular disconnected from actively set torques and furthermore generates no active wheel drive torque. In particular only one passive wheel drive torque, a so-called drag torque, is generated in this process by the electric machine. In the inactive operating mode, the electric machine is operated neither in the motor nor in the generator mode. In this process, in particular a passive zero torque of the electric machine is controlled. In such a control of a passive zero torque, the drag torque generated by the electric machine is not compensated for by a motor operating mode of the electric machine as would be the case in an active zero-torque.

If the electric machine achieves the same modification of the total wheel drive torque as the safety measure to be carried out, an immediate shut-off of the electric machine may result in a higher safety risk and to an increased accident risk. These risks and dangers may be prevented by the present invention and the hybrid vehicle may be stabilized in unstable or stability-critical driving states by the safety measures in combination with the total wheel drive neutral operation of the electric machine in a safe manner. By the present invention it may be prevented that unstable or stability-critical driving states are rendered even worse by the electric machine. The safety of occupants of the hybrid vehicle as well as of other road users may be increased.

By the present invention it is in particular prevented that an undesirable modification of the total wheel drive torque is generated by the electric machine in unstable or stability-critical driving states. Furthermore it is in particular prevented that the electric machine modifies the total wheel drive torque in such a way that the safety measure to be carried out is counteracted. Furthermore, the present invention enables that the electric machine is prevented from relaying an interfering, undesirable wheel drive torque to the wheels in unstable or stability-critical driving states.

Due to the present invention, a functional safety of the hybrid vehicle is ensured. In particular a driving instability due to the electric machine or due to a possible malfunction of the electric machine is prevented by the present invention. It is ensured by the present invention that the safety requirements or safety-critical requirements according to, for example, ISO standard 26262, are met or adhered to. In this way, the safety of occupants of the hybrid vehicle and a faultless operation of the hybrid vehicle are ensured.

Preferably, the wheel drive torque of the electric machine (i.e., the proportion of the electric machine of the total wheel drive torque) is gradually reduced in order to operate the electric machine in such a way that the sum of the wheel drive torque of the electric machine and the wheel drive torque of the safety measure is constant. The active wheel drive torque of the electric machine may be reduced continuously or successively in this process. The generator or motor operating mode is in this process gradually reduced and the electric machine is gradually and not abruptly or immediately transferred into the inactive operating mode. For this purpose, in particular a torque or drive torque of the electric machine is gradually reduced in its absolute value. Furthermore, in particular a setpoint value for the torque or the driving torque of the electric machine is gradually reduced in its absolute value. Furthermore preferred, the wheel drive torque of the electric machine is gradually reduced until the electric machine is disconnected from actively set torques, i.e., until the electric machine has been transferred into the inactive operating mode and no longer actively generates a positive or negative wheel drive torque.

In another case, the wheel drive torque-modifying effect of the electric machine may still be initially utilized by transferring the electric machine into the inactive operating mode. The electric machine initially also still actively generates a negative or a positive wheel drive torque while the respective safety measure is carried out.

Advantageously, the electric machine is then directly or immediately transferred into the inactive operating mode when the wheel drive torque-modifying safety measure is to be carried out and when the electric machine (at this point in time) is operated in the one operating mode which counteracts the modification of the total wheel drive torque intended by the safety measure to be carried out.

The transfer of the electric machine into the inactive operating mode thus takes place in a different way depending on whether the electric machine effectuates the same modification of the total wheel drive torque in the instantaneous operating mode as the safety measure to be carried out, or whether the electric machine counteracts the modification of the total wheel drive torque by the safety measure to be carried out in the instantaneous operating mode. In order to transfer the electric machine into this inactive operating mode, the electric machine is operated as a function of the safety measure to be carried out and as a function of the instantaneous operating mode of the electric machine.

If the electric machine is operated in the motor operating mode, it puts out a positive torque to the total wheel drive torque. If at this point in time a total wheel drive torque-reducing safety measure is carried out, the electric machine thus counteracts the total wheel drive torque-reducing safety measure.

If the electric machine is operated in the generator operating mode, it puts out a negative torque to the total wheel drive torque. If at this point in time a total wheel drive torque-increasing safety measure is carried out, the electric machine thus counteracts the total wheel drive torque-increasing safety measure.

Advantageously, the electric machine is in each of these two cases immediately disconnected from active torques. The electric machine is in this process switched directly and immediately into the inactive operating mode. In this way it is prevented that the electric machine actively counteracts the safety measure to be carried out, that unstable or stability-critical driving states are rendered even worse and that safety risks and accident risks are increased. The safety of the occupants of the hybrid vehicle as well as of other road users is increased.

According to one preferred embodiment of the present invention, the electric machine is immediately disconnected from active torques by carrying out a short-circuit of the phase windings of the electric machine and/or an energization of a field winding of the electric machine is terminated.

The phase windings of the electric machine are thus actively or deliberately short-circuited. The electric machine is in particular activated with the aid of a power output stage. This power output stage includes in particular one or multiple bridge circuits of circuit elements such as, for example, MOSFET transistors. The short-circuit of the phase windings is in particular carried out by simultaneously turning on all lower or all upper circuit elements of the bridge circuit of the power output stage. Alternatively or in addition, a current flow through the field winding is stopped relatively rapidly, or a corresponding field circuit is discharged relatively rapidly.

Preferably within the course of monitoring of whether a wheel drive torque-modifying safety measure is to be carried out it is (specifically) monitored whether a signal is sent out via a bus system of the hybrid vehicle. If one of the safety measures is to be carried out, such a signal or a corresponding message is sent out via the bus system. This bus system is, for example, designed as a CAN bus. With such a signal or such a message, a control device is in particular activated to carry out the safety measures.

In the course of the regular operation of the hybrid vehicle it is in particular monitored whether certain safety criteria are met. If such a safety criterion is met, one of the safety measures is triggered. In particular, transverse vehicle dynamics, longitudinal vehicle dynamics, a rotational speed of the wheels and/or the wheel drive torques themselves is/are monitored. If at least one of those monitored variables exceeds a threshold value, a corresponding safety criterion is met. In this case, the signal is sent out via the bus system and the corresponding safety measure is triggered.

A system superordinate to the electric machine, for example a control device of the electric machine or a control device of the hybrid vehicle, carries out this monitoring. Furthermore, this superordinate system in particular activates the electric machine when the superordinate system detects that one of the safety measures is to be carried out.

Preferably, the electric machine is again operated in the motor operating mode or in the generator operating mode when the wheel drive torque-modifying safety measure is no longer to be carried out. The inactive operating mode of the electric machine is terminated and the regular operating mode of the electric machine is resumed. The superordinate system checks in particular whether the corresponding safety measure is no longer being carried out. Furthermore, the superordinate system monitors for this purpose whether a corresponding signal is sent out via the bus system and/or whether a control device for carrying out the safety measures is deactivated. Furthermore, in particular the superordinate system only is authorized to terminate the inactive operating mode and to put the electric machine back into the motor or generator operating mode. It may thus be prevented that the inactive operating mode is terminated erroneously.

An arithmetic unit according to the present invention, for example, a control device of a hybrid vehicle, is, in particular, programmed for carrying out a method according to the present invention.

It is also advantageous to implement the method in the form of software, since this is particularly cost-effective, in particular when an executing control device is used for other tasks and is thus present anyway. Suitable data carriers for providing the computer program are, in particular, floppy disks, hard disks, flash memories, EEPROMs, CD-ROMs, DVDs, and many others. It is also possible to download a program via computer networks (Internet, Intranet, etc.).

Additional advantages and embodiments of the present invention arise from the description and the accompanying drawings.

It is understood that the above-mentioned features and the features to be elucidated below are usable not only in the given combination, but also in other combinations or alone without departing from the scope of the present invention.

The present invention is schematically illustrated in the drawings on the basis of exemplary embodiments and described in greater detail in the following with reference to the drawings.

DETAILED DESCRIPTION OF THE INVENTION

Figure 1:
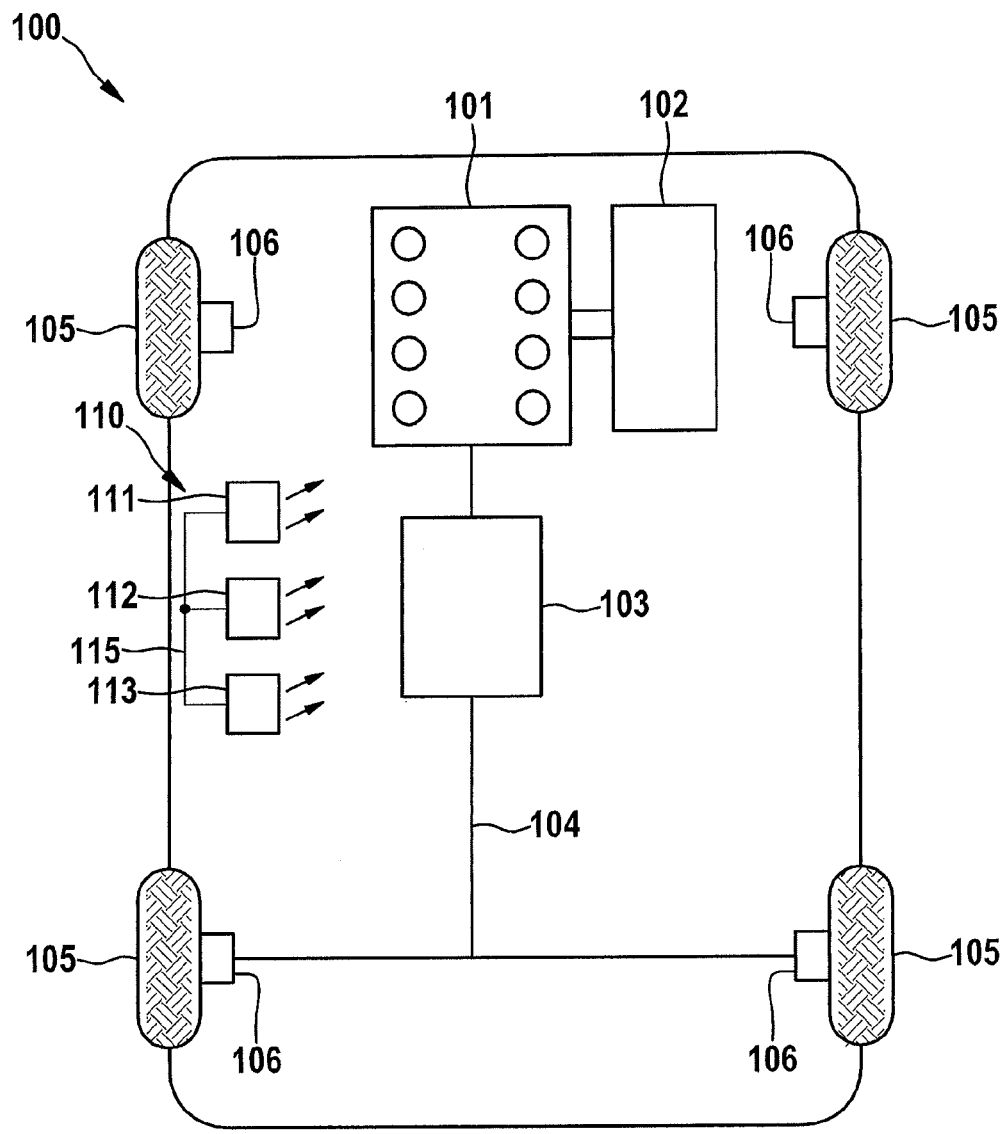
FIG. 1 schematically shows one preferred embodiment of a hybrid vehicle according to the present invention which is configured to carry out one preferred specific embodiment of a method according to the present invention.

FIG. 1 schematically shows a preferred embodiment of a hybrid vehicle according to the present invention denoted by reference numeral 100.

Hybrid vehicle 100 includes an internal combustion engine 101 and an electric machine 102. Electric machine 102 is, for example, connected via a belt to a crankshaft of internal combustion engine 101.

A drive torque is generated by internal combustion engine 101. This drive torque is transmitted via a transmission 103 and a drive shaft 104 to wheels 105 of hybrid vehicle 100. A wheel drive torque of internal combustion engine 101 is thus generated at wheels 105.

A total wheel drive torque at wheels 105 is composed of this wheel drive torque of internal combustion engine 101 and of a wheel drive torque of electric machine 102.

Electric machine 102 may be operated in a motor or in a generator operating mode. In the generator operating mode, electric machine 102 absorbs a drive torque. The total wheel drive torque is thereby reduced at wheels 105 by electric machine 102. In the motor operating mode, electric machine 102 generates a torque. The total wheel drive torque at wheels 105 is increased by electric machine 102 in this process.

Hybrid vehicle 100 furthermore includes multiple arithmetic units designed as control devices 110. These control devices 110 are linked with one another via a CAN bus system 115. One first control device 111 monitors whether certain safety criteria are met. For example, first control device 111 monitors whether the differential rotational speed of wheels 105 reaches a threshold value. This points to an unstable, stability-critical driving state. Depending on whether the differential rotational speed exceeds a maximum value or falls below a minimum value, first control device 111 triggers a corresponding driver assistance function as a wheel drive torque-modifying safety measure in order to restabilize the driving state. For this purpose, first control device 111 sends a signal via CAN bus 115 and thereby activates a driver assistance control device 112.

This driver assistance control device 112 carries out the corresponding wheel drive torque-modifying safety measure. Within the course of these safety measures, driver assistance control device 112 activates internal combustion engine 101 and/or brakes 106 of wheels 105 in order to either reduce or increase the total wheel drive torque of all or individual wheels 105. Such safety measures are preferably an engine drag torque control (MSR), a traction control system (TCS), an anti-lock braking system (ABS) and/or an electronic stability program (ESP).

For example, when starting with application of too much gas or when accelerating on a wet, slippery roadway, wheels 105 of hybrid vehicle 100 may spin. The differential rotational speed of wheels 105 thereby exceeds a corresponding maximum value. In this case, driver assistance control device 112 carries out the traction control in order to prevent wheels 105 from spinning.

For example, when abruptly releasing the accelerator on a wet, slippery roadway, hybrid vehicle 100 may slip. The differential rotational speed of wheels 105 thereby falls below a corresponding maximum value. Driver assistance control device 112 carries out the engine drag torque control in order to prevent such slipping of hybrid vehicle 100.

Figure 2:
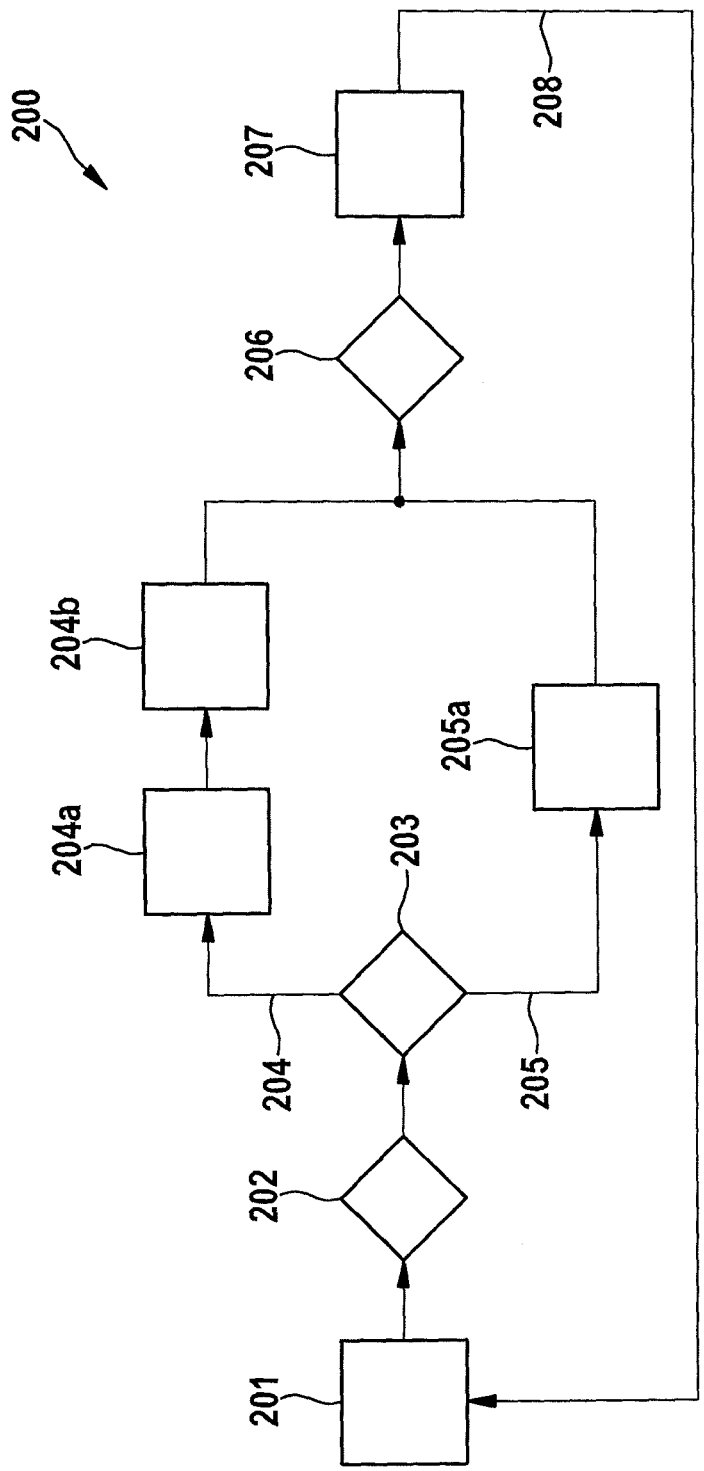
FIG. 2 schematically shows a preferred specific embodiment of a method according to the present invention as a block diagram.

In order to prevent that the driving state is rendered even worse by the electric machine in such an unstable, stability-critical driving state, a safety control device 113 is designed to carry out a preferred specific embodiment of a method according to the present invention which is shown schematically in FIG. 2 as a block diagram 200.

In step 201, hybrid vehicle 100 is operated in a regular operating mode. For a practical description, electric machine 102 is operated in the following in the motor operating mode as an example. In the case of a generator operating mode of electric machine 102, the sequence takes place similarly to block diagram 200.

In the course of this regular operating mode, safety control device 113 checks in step 202 whether a wheel drive torque-modifying safety measure is to be carried out. For this purpose, the control device monitors whether the corresponding signal is sent out via CAN bus 115 in order to activate driver assistance control device 112.

If such a signal is sent out via CAN bus 115, safety control device 113 transfers electric machine 102 into an inactive operating mode. In the inactive operating mode, electric machine 102 is disconnected from active torques and no longer generates any active wheel drive torque.

Depending on which safety measure is to be carried out, safety control device 113 transfers electric machine 102 into the inactive operating mode in two different ways.

In step 203, safety control device 113 checks whether the same wheel drive torque-modifying effect is effectuated by electric machine 102 in the motor operating mode as by the safety measure to be carried out.

This is the case in this specific example in step 204. In step 204, driver assistance control device 112 is to carry out, for example, the engine drag torque control as a wheel drive torque-increasing safety measure. Electric machine 102 in the motor operating mode thus effectuates the same wheel drive torque-modifying effect as the safety measure to be carried out.

In the course of the engine drag torque control, driver assistance control device 112 increases a setpoint value for the total wheel drive torque. For example, driver assistance control device 112 activates internal combustion engine 101 in such a way that the drive torque generated by internal combustion engine 101 is increased in order to increase an actual value for the total wheel drive torque to the corresponding setpoint value.

Simultaneously, safety control device 113 continuously reduces a setpoint value of the active wheel drive torque of electric machine 102 in step 204a. In total, the sum of the active wheel drive torque of electric machine 102 and the wheel drive torque of the safety measure remains constant. The wheel drive torque generated by electric machine 102 is thus gradually reduced; the total wheel drive torque remains unaffected by this at the predefined setpoint value.

Safety control device 113 reduces the setpoint value of the active wheel drive torque of electric machine 102 until this active wheel drive torque reaches the value zero in step 204b. In step 204b, electric machine 102 is transferred into the inactive operating mode.

As an alternative, electric machine 102 in the motor operating mode does not effectuate the same wheel drive torque-modifying effect in step 205 as the safety measure to be carried out.

In step 205, driver assistance control device 112 is to carry out, for example, the traction control as a wheel drive torque-reducing safety measure. Electric machine 102 thereby counteracts the wheel drive torque-modifying effect of the safety measure to be carried out.

In the course of the traction control, driver assistance control device 112 reduces the setpoint value for the total wheel drive torque. For example, driver assistance control device 112 activates brakes 106 at wheels 105 in such a way that the total wheel drive torque is reduced in order to thus reduce the actual value for the total wheel drive torque to the corresponding setpoint value.

At the same time, safety control device 113 disconnects electric machine 102 from active torques in step 205a and transfers electric machine 102 directly into the inactive operating mode. For this purpose, safety control device 113 generates a short-circuit of phase windings of electric machine 102 and terminates an energization of a field winding of electric machine 102.

After safety control device 113 has transferred electric machine 102 into the inactive operating mode, safety control device 113 checks in step 206 whether the safety measure is no longer being carried out. The corresponding signal is in particular no longer sent out via CAN bus 115 when the safety measure is no longer carried out. In step 206, safety control device 113 checks whether the signal is no longer being sent out via CAN bus 115.

If this is the case, safety control device 113 reactivates electric machine 102. Safety control device 113 thereby deactivates the inactive operating mode of electric machine 102 in step 207 and transfers electric machine 102 into the motor operating mode again. Hybrid vehicle 100 is in this case again operated in the regular operating mode, as indicated by reference numeral 208.

What is claimed is:

1. A method for operating a hybrid vehicle including an internal combustion engine and an electric machine, a total wheel drive torque being composed of a wheel drive torque of the internal combustion engine and a wheel drive torque of the electric machine, the method comprising:

selectively operating the electric machine in one of a motor operating mode or a generator operating mode, wherein the total wheel drive torque is increased by the wheel drive torque of the electric machine in the motor operating mode, and wherein the total wheel drive torque is reduced by the wheel drive torque of the electric machine in the generator mode;

monitoring whether a wheel-drive-torque-modifying safety measure is to be carried out; and operating the electric machine in such a way that the sum of the wheel drive torque of the electric machine and the wheel drive torque of the wheel-drive-torque-modifying safety measure remains constant when (i) the electric machine is operated in the generator operating mode and a wheel-drive-torque-reducing safety measure is carried out, or (ii) the electric machine is operated in the motor operating mode and a wheel-drive-torque-increasing safety measure is to be carried out.

2. The method as recited in claim 1, wherein the electric machine is disconnected from active torques when (i) the electric machine is operated in the generator operating mode and the wheel-drive-torque-increasing safety measure is carried out, or (ii) the electric machine is operated in the motor operating mode and the wheel-drive-torque-reducing safety measure is carried out.

3. The method as recited in claim 2, wherein the electric machine is disconnected from active torques by at least one of (i) a short-circuit of phase windings of the electric machine and (ii) termination of energization of a field winding of the electric machine.

4. The method as recited in claim 2, wherein the wheel drive torque of the electric machine is gradually reduced when the electric machine is operated in such a way that the sum of the wheel drive torque of the electric machine and the wheel drive torque of the wheel-drive-torque-modifying safety measure is constant.

5. The method as recited in claim 4, wherein the wheel drive torque of the electric machine is gradually reduced until the electric machine is disconnected from active torques.

6. The method as recited in claim 2, wherein the monitoring of whether the wheel-drive-torque-modifying safety measure is to be carried out includes monitoring whether a signal is sent out via a bus system of the hybrid vehicle.

7. The method as recited in claim 2, wherein, when the wheel-drive-torque-modifying safety measure has ended, the electric machine is operated again in one of the motor operating mode or the generator operating mode.

8. The method as recited in claim 2, wherein at least one of an engine drag torque control and an electronic stability control is carried out as the wheel-drive-torque-increasing safety measure.

9. The method as recited in claim 8, wherein at least one of a traction control, an anti-lock braking control, and an electronic stability control is carried out as the wheel-drive-torque-reducing safety measure.

10. A control system for operating a hybrid vehicle including an internal combustion engine and an electric machine, a total wheel drive torque being composed of a wheel drive torque of the internal combustion engine and a wheel drive torque of the electric machine, the control system comprising:

a controller including a processor configured to perform the following:

selectively operating the electric machine in one of a motor operating mode or a generator operating mode, wherein the total wheel drive torque is increased by the wheel drive torque of the electric machine in the motor operating mode, and wherein the total wheel drive torque is reduced by the wheel drive torque of the electric machine in the generator mode;

monitoring whether a wheel-drive-torque-modifying safety measure is to be carried out; and operating the electric machine in such a way that the sum of the wheel drive torque of the electric machine and the wheel drive torque of the wheel-drive-torque-modifying safety measure remains constant when (i) the electric machine is operated in the generator operating mode and a wheel-drive-torque-reducing safety measure is carried out, or (ii) the electric machine is operated in the motor operating mode and a wheel-drive-torque-increasing safety measure is to be carried out.

11. A non-transitory, computer-readable data storage medium storing a computer program having program codes which, when executed on a computer, perform method for operating a hybrid vehicle including an internal combustion engine and an electric machine, a total wheel drive torque being composed of a wheel drive torque of the internal combustion engine and a wheel drive torque of the electric machine, the method comprising:

selectively operating the electric machine in one of a motor operating mode or a generator operating mode, wherein the total wheel drive torque is increased by the wheel drive torque of the electric machine in the motor operating mode, and wherein the total wheel drive torque is reduced by the wheel drive torque of the electric machine in the generator mode;

monitoring whether a wheel-drive-torque-modifying safety measure is to be carried out; and operating the electric machine in such a way that the sum of the wheel drive torque of the electric machine and the wheel drive torque of the wheel-drive-torque-modifying safety measure remains constant when (i) the electric machine is operated in the generator operating mode and a wheel-drive-torque-reducing safety measure is carried out, or (ii) the electric machine is operated in the motor operating mode and a wheel-drive-torque-increasing safety measure is to be carried out.

* * * * *